Nov. 28, 1944. O. M. CARLSON 2,363,943
WELD FABRICATED VALVE
Filed Sept. 4, 1942 2 Sheets-Sheet 1

Inventor:
Otto M. Carlson
By Joseph O. Lange
Atty.

Nov. 28, 1944.   O. M. CARLSON   2,363,943
WELD FABRICATED VALVE
Filed Sept. 4, 1942   2 Sheets-Sheet 2
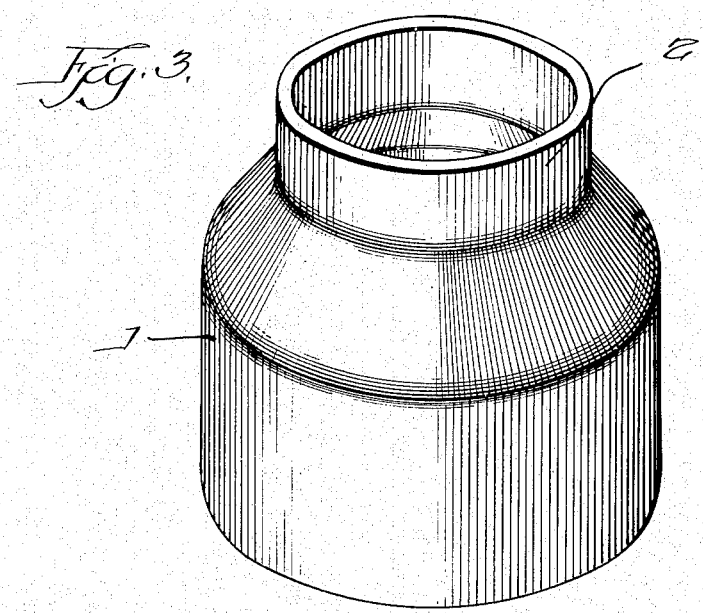
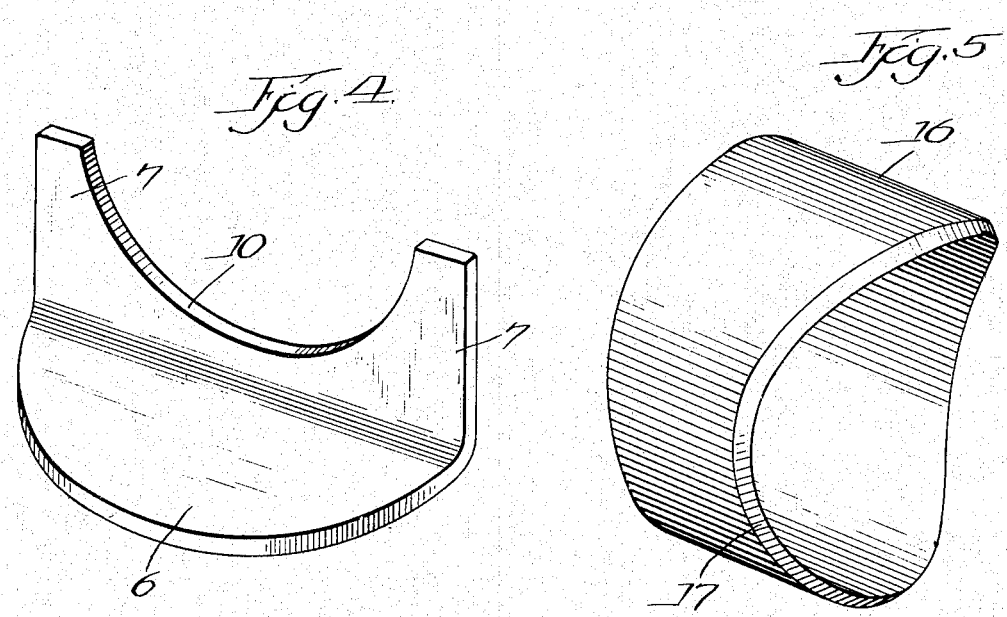
Inventor:
Otto M. Carlson
By Joseph O. Lange
Atty.

Patented Nov. 28, 1944

2,363,943

UNITED STATES PATENT OFFICE 2,363,943

WELD FABRICATED VALVE

Otto M. Carlson, Chicago, Ill., assignor to Crane Co., Chicago, Ill., a corporation of Illinois Application September 4, 1942, Serial No. 457,253

4 Claims. (Cl. 251—156)

This invention relates to valve manufacture and more particularly to a new and improved weld fabricated valve body or casing. It has for one of its principal objects the provision of a valve casing which is relatively simple in structure and which requires less handling and machining during its course of manufacture thereby effecting more economical production than previously fabricated valves of this general type.

Weld fabricated valves have been manufactured for a number of years in competition with the heavier cast valves. There are numerous advantages in favor of welded valves but perhaps most important is that the latter may be made of considerably lighter weight material than the cast valves and therefore greatly reduce the overall weight and cost of the valve. From several standpoints, such as for use on ship-board or elsewhere in which light weight is an important consideration, the weld fabricated valve has been favorably received. However, heretofore weld fabricated valves have presented a number of relatively difficult manufacturing problems ordinarily not encountered in the course of manufacture of cast metal valves. For example, it has been common practice to use a piece of steel tubing swaged at both ends to the desired diameters and then proceed to cut this piece of swaged tubing into two irregularly shaped parts to form the valve body or casing. This metal cutting operation has been generally accomplished by means of an acetylene torch with the usual result that the relatively rough welding edges on both parts required a special milling or other expensive finishing operation in order to permit the usual bridge or diaphragm wall to be welded between the selected parts of the swaged tubing. It is well accepted that such milling operations are not only relatively expensive but because of the irregularity of form automatic machine operations are not practicable and therefore promote delayed production.

It is therefore an important object of my invention to eliminate prior expensive machining operations as well as to avoid the necessity for welding more than two separate parts at any one time and thereby dispensing with the use of costly assembly jigs.

Another important object of this invention is to provide a fabricated valve casing or the like adapted to be welded into a unitary assembly necessitating only a minimum of machining after the parts have been preformed or shaped prior to welding.

A further important object of my invention is to provide a weld fabricated valve casing in which many of the welds are internally positioned for greater strength and also in thereby presenting an improved appearance outwardly.

Other and further important objects will become apparent from the disclosures in connection with the following specification and the accompanying drawings, in which Fig. 1 is a vertical sectional view of the novel weld fabricated valve body illustrative of my invention.

Fig. 3 is a perspective exterior view of one of the novel swaged pipe sections used for the valve body fabrication shown in Figs. 1 and 2.

Fig. 4 is a perspective exterior view of the novel member constituting a half section of the bridge-wall or valve diaphragm before being welded within the sections described in connection with Fig. 3.

Fig. 5 is a perspective exterior view of the valve bonnet nozzle member before being welded to the valve casing assembly.

Like reference numerals refer to like parts in the respective views of the drawings.

Figures 1, 2:
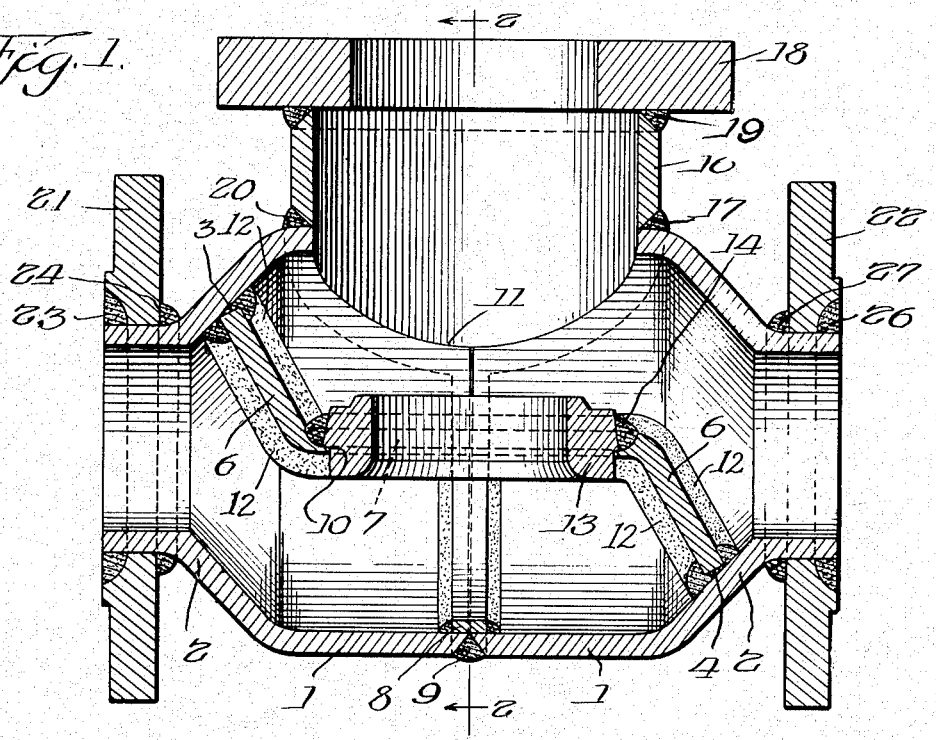
Fig. 2 is a sectional view taken on the line 2—2 of Fig. 1.

As shown in Fig. 1 of the drawings, the reference numeral 1 indicates generally a section of pipe or tubing swaged at one end to a smaller diameter to form the inlet and outlet of a globe valve body or the like, as shown at the reduced portion 2. The general shape of the swaged pipe or tubing is shown more clearly in Fig. 3. At the outset two of the sections 1 which are identical in shape and size are used to form the body of the valve as shown in Fig. 1 wherein the circumferential ends of the pipe or tubing forming the larger diameter or bulge portion of the valve body are welded to form a unitary valve casing. Before the two swaged pipe sections 1 are welded together, however, a half section of the bridge-wall or valve diaphragm 6 of the shape shown in Fig. 4 is welded within each swaged pipe section 1 as more clearly indicated in Fig. 1, at 3 and 4 respectively, the annular seat receiving portion of the diaphragm 6 being designated by the numeral 7. While line welds 3 and 4 are shown as extending on both sides of the diaphragm 6, it is obvious that such welds may be applied only to a single side if desired. As indicated, in the left hand swaged pipe section the peripheral portion of the bridge-wall 6 is welded to the inner curved wall of the swaged pipe section at a location intermediate the large and small end diameters of the swaged pipe section. In completing the valve diaphragm the other half of the bridge-wall section which is identical to the first mentioned part is inverted and welded to the right hand body section of the valve as shown in Fig. 1. Thus, as previously mentioned generally, in the case of the swaged pipe sections 1, each bridge-wall section is identical to the other half portion, thereby resulting in greater ease of assembly and in lower costs of manufacture because of the reduction of forming dies to a minimum. It will be noted that similarly the opposite half section bridge-wall 6 is welded to the swaged pipe at the lower portion thereof and is also positioned between the large and small end diameters of the swaged pipe or tubing section. The net result is that the seat portions 7 of the bridge-wall half section form a horizontal partition with an aperture therethrough as indicated at 10. A welding ring 8 arcuately extending and substantially semi-circular in shape is positioned internally of the juncture between the adjoining sections of the swaged pipe and acts as a back-up or supporting ring for the welding together of the swaged pipe sections. If desired, on certain sizes of valves, for example, the back-up ring may be dispensed with, or else instead of being welded on both edges, as indicated, it may be held simply by the outer weld 9, by which means the valve body is welded. Preferably at this stage of the procedure an aperture 11 is cut either by flame or other means in the top portion of the welded body formed by the joining of the two swaged pipe sections 1. The ease of entry provided by the aperture 11 permits each half bridge section to be welded to form a unitary partition or diaphragm, as shown by the weld at 12 in Fig. 1. Subsequent to forming the unitary bridge or diaphragm within the casing 1, a body seat ring 13 is preferably placed within the aperture 11 and welded at the upper periphery of the aperture in the bridge, as shown at 14. The seat ring 13 may be dispensed with in such cases in which the seat itself may be made integral with the bridge wall or, if desired, the seat may be laid in, as it is termed, with a special seating metal by means of an acetylene torch or the like.

The next operation lies in applying the bonnet nozzle 16 of saddle-like form, as shown in Fig. 5, to the valve body. As shown in Fig. 1, the bonnet nozzle 16 surrounds the aperture 11 for its welding connection at 20. As indicated, the curved lower portion 17 of the bonnet nozzle 16 is adapted to fit the saddle-formed periphery of the aperture 11 relatively closely. The latter aperture is preferably made in the upper portion of the valve body by suitable cutting out of metal preferably after the welding together of the two swaged pipe sections 1 has been completed, although obviously it could be done beforehand, if desired. Next a bonnet flange 18 is thereupon welded to the upper annular portion of the bonnet nozzle, as shown in Figs. 1 and 2, as at 19, for connection to the bonnet or yoke and other valve trimmings (not shown) necessary in actuating the valve.

Each of the end flanges 21 and 22 is adapted to be welded to the reduced swaged pipe sections as shown at 23 and 24 and 26 and 27 respectively, for providing the usual end connections to a pipe line (not shown). Obviously the manner in which these pipe connections are made is not significant and accordingly may be varied in using screwed, welded, brazed or other connections, as desired.

It is evident that a minimum number of machining operations is required on this novel weld fabricated valve. The larger portion of the machining required constitutes the relatively simple, flat milling of the ends of the swaged pipe ends 1 and one end of the bonnet nozzle 16, including the bonnet flange 18 and the end flanges 21—22. The lower end of the bonnet nozzle is machined to follow closely the outer contour of the valve body surface. Welded valves of this type have been made from one piece of pipe or tubing swaged at both ends and then subsequently cut into two parts having irregular edges or surfaces making milling operations impracticable. However even conceding that such a difficult operation was done by milling it then became necessary to hold the bridge wall accurately and to weld it between two portions of swaged pipe. This procedure led to troubles resulting from the attempt to hold three separate parts properly fixed while a weld was being made. A holding jig which would accommodate the three separate parts for a single weld was relatively complicated and expensive to manufacture. In the present welded valve casing procedure of my invention at no time are more than two pieces welded together in a single weld, thereby eliminating the use of the prior expensive jigs for holding the several parts of the fabricated valve during the preliminary weld assembly.

The invention is not limited to the specific constructions shown for many modifications may be made without departing from the spirit and scope of this invention as defined in the appended claims.

I claim:

1. A weld fabricated valve casing comprising, in combination, a pair of identical swaged tubular sections welded together to form the inlet and outlet of the said valve, a pair of angular plate members relieved to form a common aperture therebetween and welded to an interior surface of said swaged tubular sections, a substantially semi-circular supporting member within the said casing positioned at the juncture of the weld joining the said swaged tubular sections, the opposite end portions of the said supporting member terminating in a plane just below the weld joining the angular plate members adjacent the common aperture therebetween.

2. A weld fabricated valve casing comprising, in combination, a plurality of identical welded sections of swaged pipe, a plurality of identical welded sections of angular plates comprising a bridge wall and welded to inner portions of the said swaged pipe sections, the welded sections of the said swaged pipe forming an aperture, a tubular member surrounding the aperture of the said swaged pipe sections and welded to a portion of both of the said swaged pipe sections, a unitary seat ring weldably secured to a flat portion of the angular plate bridge wall, a portion of the weld for connecting the said seat ring to the said angular plates also serving to connect the said angular plates with each other at a location in axial alignment with the aperture of the swaged pipe sections.

3. A weld fabricated valve casing comprising identical sections of swaged pipe to form the inlet and outlet respectively, identical angular plate sections forming a valve diaphragm welded on both sides interiorly to the said swaged pipe sections, the said angular plate sections being weld joined and forming an aperture interrupting an upper surface of the welded assembly thereof to form a seat therefor, the said swaged pipe sections forming an aperture in substantial alignment axially with the aperture of the angular plate sections, a tubular extension welded to the said swaged pipe sections and being weld joined to the periphery of the aperture of the said swaged pipe sections.

4. In a welded valve body, the combination consisting of a pair of identical tubular reducing sections positioned for welding on a common centerline and having relieved portions to form a side outlet aperture, a pair of angular plate members welded at least on one side thereof to the interior of the said tubular reducing sections to form a diaphragm portion for the valve body and having complementary substantially semicircular relieved portions to form conjointly a seat and a port in the diaphragm portion, the said plate members being welded together, the seat and port in the diaphragm portion being in substantial axial alignment with said side outlet aperture of the said tubular reducing sections, the side outlet aperture being substantially not greater in diameter than the port in the diaphragm portion.

OTTO M. CARLSON.